US012808758B2

(12) United States Patent
Foster

(10) Patent No.: US 12,808,758 B2
(45) Date of Patent: Nov. 24, 2026

(54) AIR SAMPLING PUMP

(71) Applicant: Jamie Dean Foster, Pulaski, FL (US)

(72) Inventor: Jamie Dean Foster, Pulaski, FL (US)

( * ) Notice: Subject to any disclaimer, the term of this patent is extended or adjusted under 35 U.S.C. 154(b) by 244 days.

(21) Appl. No.: 18/778,134

(22) Filed: Jul. 19, 2024

(65) Prior Publication Data

US 2026/0022995 A1 Jan. 22, 2026

(51) Int. Cl.
*G01N 1/24* (2006.01)

(52) U.S. Cl.
CPC .................................... *G01N 1/24* (2013.01)

(58) Field of Classification Search
CPC .......... G01N 1/24; G01N 1/2273; G01N 1/22; G01N 1/2202; G01N 1/2208; G01N 1/2214; G01N 2001/2223
USPC ............. 73/23.2, 23.33, 28.01, 28.04–28.06, 73/31.01, 863.23, 863.25, 864, 864.34
See application file for complete search history.

(56) References Cited

U.S. PATENT DOCUMENTS 4,461,184 A * 7/1984 Gandhi ................ G01N 1/2226
73/863.25

FOREIGN PATENT DOCUMENTS

CN 114544272 B * 12/2023 ........... G01N 1/2205
CN 117871189 A * 4/2024 ............... G01N 1/34
FR 3107958 A1 * 9/2021 ........... G01N 1/2205

* cited by examiner

*Primary Examiner* — Robert R Raevis
(74) *Attorney, Agent, or Firm* — The Rapacke Law Group, P.A.; Andrew S. Rapacke; Kenneth F. Brooks

(57) ABSTRACT

An air sampling pump is disclosed, including a housing to contain a pump, a battery, and a switch. The switch controls a regulator to control the speed of the pump. A coupler is positioned on an exterior surface of the housing. The coupler releasably connects a hose to the housing, wherein the hose is in fluid communication with the pump to enable the pump to draw air through at least one cassette positioned at an opening at an end of the hose. The cassette collects an air sample to enable the analysis of the air sample for which can be used to measure air contaminants such as asbestos, lead, and mold.

17 Claims, 5 Drawing Sheets

AIR SAMPLING PUMP

TECHNICAL FIELD

The embodiments disclosed herein generally relate to air sampling pumps and more specifically to asbestos, mold, and lead air sampling pumps.

BACKGROUND

A pump is a device which moves fluids (liquids or gases) by mechanical action. Pumps serve a wide range of applications and have various mechanisms of action depending on their intended use. In particular, air sampling pumps operate by actively pulling ambient air from the surrounding environment and are often employed to determine dust levels in the ambient environment prior to, during, and after an abatement project. In one example, air sampling pumps are used to perform background air monitoring prior to asbestos abatement projects where barriers or enclosures are constructed, or during any project where asbestos may be disturbed which may affect the surrounding environment. The air sample pumps may also be used to perform perimeter air monitoring, to monitor employee exposure, and to perform clearance air monitoring.

Air sampling pumps that are currently available consume significant amounts of power and require a generator as a power source. This requires sufficient fuel for the generator and extension cords and splitters to connect electricity to the pump. These devices tend to be heavy, impacting their portability which makes them difficult to transport to and from the sample locations.

SUMMARY OF THE INVENTION

This summary is provided to introduce a variety of concepts in a simplified form that is further disclosed in the detailed description of the embodiments. This summary is not intended for determining the scope of the claimed subject matter.

An air sampling pump is disclosed, including a housing to contain a pump, a battery, and a switch. The switch controls a regulator to control the flow rate of the pump. A coupler is positioned on an exterior surface of the housing. The coupler releasably connects a hose to the housing, wherein the hose is in fluid communication with the pump to enable the pump to draw air through at least one cassette positioned at an opening at an end of the hose. The cassette collects an air sample to enable the analysis of the air sample for which can be used to measure air contaminants such as asbestos, lead, and mold.

The air sampling pump is powered by a rechargeable battery which enables the operation of the pump in off-grid environments or in structures which do not have a power supply. This removes the need for utilizing a generator to power the pump.

In some embodiments, the rechargeable battery is a 12-volt 6 Amp Hour (Ah) rechargeable battery which allows the pump to operate at high volume and low volume speeds for extended periods of time. In another embodiment, the battery is a 24-volt rechargeable battery. In such, the pump is capable of functioning as a high volume pump and a low volume pump, eliminating the need for operators to utilize multiple pumps during the air sampling processes.

BRIEF DESCRIPTION OF THE DRAWINGS

A complete understanding of the present embodiments and the advantages and features thereof will be more readily understood by reference to the following detailed description when considered in conjunction with the accompanying drawings wherein.

DETAILED DESCRIPTION

Figure 1:
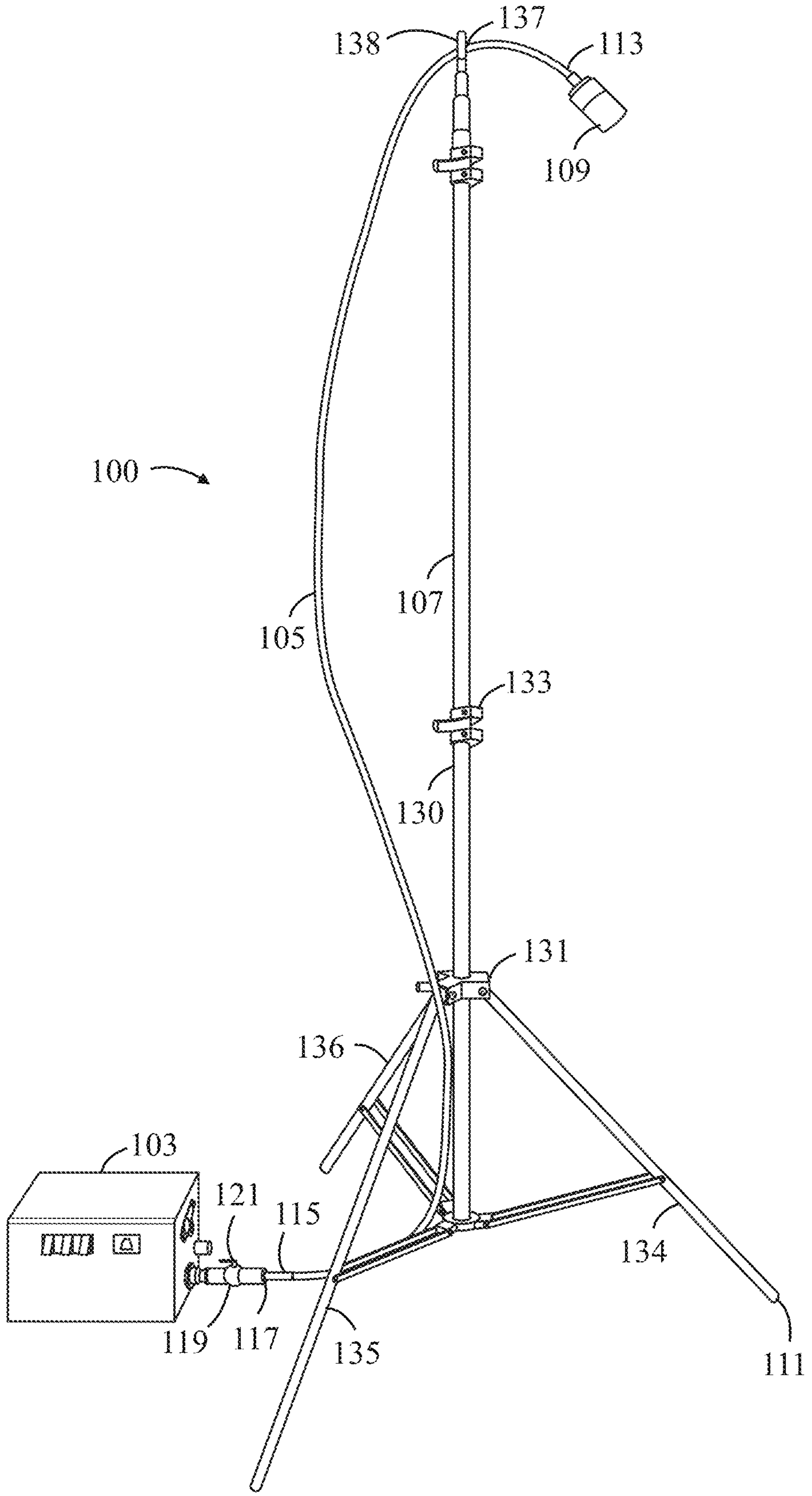
FIG. 1 illustrates a perspective view of the air sampling pump, according to some embodiments.

The specific details of the single embodiment or variety of embodiments described herein are set forth in this application. Any specific details of the embodiments described herein are used for demonstration purposes only, and no unnecessary limitation(s) or inference(s) are to be understood or imputed therefrom.

Before describing in detail exemplary embodiments, it is noted that the embodiments reside primarily in combinations of components related to particular devices and systems. Accordingly, the device components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In general, the embodiments provided herein relate to an air sampling pump which is used to sample air in an environment before, during, and after an abatement project. The air sampling pump draws air from the environment through a cassette which collects the air sample and enables an operator to test the air sample for contaminants such as lead, asbestos, mold and other hazardous materials.

The air sampling pump is powered by a rechargeable battery which enables the operation of the pump in off-grid environments or in structures which do not have a power supply. This removes the need for utilizing a generator to power the pump. Further, removing the need for a generator also removes the need for carrying and utilizing extension cords and splitters for transmitting energy from the generator to the pump.

In some embodiments, the rechargeable battery is a 12-volt 6 Amp Hour (Ah) rechargeable battery which allows the pump to operate at high volume and low volume speeds for extended periods of time. In such, the pump is capable of functioning as a high volume pump and a low volume pump, eliminating the need for operators to utilize multiple pumps during the air sampling processes. In another embodiment, the battery is a 24-volt rechargeable battery. One skilled in the arts will readily understand that various batteries may be utilized without deterring from the present embodiments.

FIG. 1 illustrates the air sampling pump assembly 100 positioned in an environment to enable the collection of an air sample. The air sampling pump 100 includes a housing 103 which contains the pump components. A hose 105 extends from the housing 103 to a stand 107 which raises at least one cassette 109 above the ground surface 111 such that the cassette collects an air sample which may contain hazardous materials suspended in the air within the environment. The cassette 109 is attached at a first end 113 of the hose 105. A second end 115 of the hose 105 is connected to a coupler 117 to enable the attachment of the hose to the housing 103. The coupler 117 is attached to a regulator 119 to enable an operator to control the speed at which the pump is able to draw air through the cassette 109. The stand 107 supports the hose 105 and cassette 109 in a suspended position.

In some embodiments, the stand 107 be a fixed-position stand, or may be an adjustable stand 130 to enable the user to select the height of the stand 107 based on the application for which the air sampling pump 100 is being used. The adjustable stand 130 may be configured as an adjustable tripod stand 131 which includes adjustable legs to allow for its placement on variable ground surfaces and terrain. In the illustrated embodiment, the stand 107 includes a modular neck 133 and modular legs 134, 135, 136 which are each capable of extending and retracting. A receiver 137 may be provided at the top 138 of the stand 107 which holds the hose 105 in position.

In some embodiments, the coupler 117 includes a quick-connect mechanism to enable an operator to efficiently connect and disconnect the hose 105. In such, when the air sampling pump 100 is not in-use, the hose 105 may be disconnected from the housing 103 to facilitate the efficient storage of the housing 103 by providing the ability to store the housing 103 without the hose 105 being attached.

In some embodiments, the regulator 119 enables the fine-tuned adjustment of the speed at which air is drawn through the cassette 109 via a valve 121. The regulator 119 may be utilized while the pump is operating during the high volume or low volume settings of the pump and provides a means of fine-tuning the air speed separate from the high volume and low volume function provided by the switch.

In some embodiments, the hose 105 may be a ¼-inch hose constructed of a flexible material (e.g., rubber). One skilled in the arts will readily understand that the size, configuration, and materials of the hose 105 may be altered without deterring from the embodiments presented herein. The optimal size, material, and configuration of the hose 105 may be determined by the height of the stand, pump configuration, and other considerations which enable the accurate sampling of air within the environment.

Figure 2:
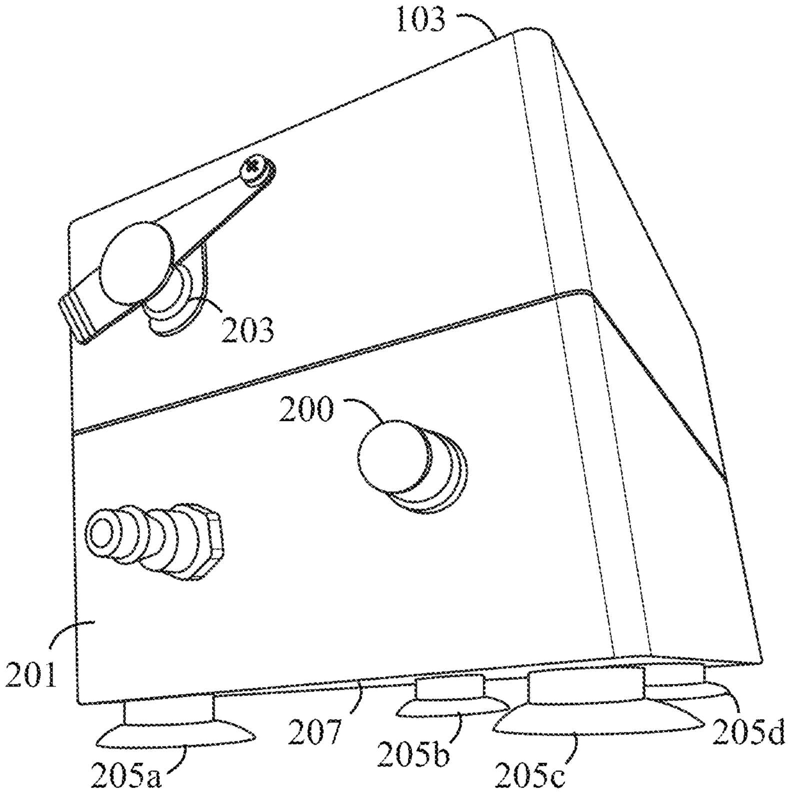
FIG. 2 illustrates a perspective view of the housing of the air sampling pump, according to some embodiments.

FIG. 2 illustrates a perspective view of the housing 103 of the air sampling pump. The housing 103 protects and contains the interior components used to control and power the air sampling pump. A switch 200 is provided on a surface 201 of the housing 103. The switch is in electrical communication with a circuit board to enable the operator to select the operational function of the air sampling pump. The switch may allow for the operator to select between an off function, a high volume function and a low volume function. Selecting the low/off/high switch function allows the user to selectively turn the pump on and off to initiate or cease an air sampling procedure. Selecting the high volume function instructs the pump to operate at a high volume speed. Selecting the low volume function instructs the pump to operate at a low volume speed. In one example, the high volume function instructs the pump to operate at a speed of up to 15 liters per minute (lpm). In one example, the low volume function instructs the pump to operate at 5 lpm. The regulator 119 allows the user to fine-tune the speed. For example, the operator may select the high volume function in which the pump is operating at 15 lpm while then adjusting the valve on the regulator to regulate the flow of air to 12 lpm. A plurality of feet 205*a*, 205*b*, 205*c*, 205*d* are positioned on the bottom 207 of the housing 103. The feet 205*a*, 205*b*, 205*c*, 205*d* aid in preventing the air sampling pump 100 from moving during its operation. A vent enables the flow of air out of the interior of the housing 103.

In further reference to FIG. 2, the housing 103 includes a charging port 203 in electrical communication with the rechargeable battery contained within the housing 103. The charging port 203 can be electrically connected to an external power source capable of transmitting electricity to the rechargeable battery. Once the rechargeable battery is sufficiently charged, the input is disconnected from the charging port 203, thus providing a wireless air sampling pump capable of being portable and deployable in locations which are off-grid or otherwise do not have an adequate power supply.

Figure 3:
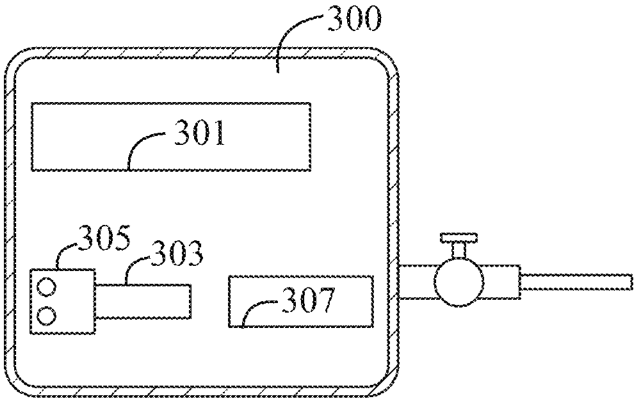
FIG. 3 illustrates a perspective view of the interior components of the housing including the battery, motor, and circuit board used for powering and controlling the pump, according to some embodiments.

FIG. 3 illustrates the interior 300 of the housing 103 including the battery 301, motor 303, pump 305 and circuit board 307. The battery 301 in in electrical communication with the motor 303 and circuit board 307 to provide electrical power thereto. The battery 301 is rechargeable and is capable of receiving electrical power from the charging port (as shown in FIG. 2). The battery 301 is capable of storing sufficient energy to power the pump 305 for extended periods of time and while the pump functions at high and/or low volume functions. The motor 303 powers the pump 305 which is controlled by the circuit board 307. The circuit board 307 is in electrical communication with the switch to enable the user to input operational functions which instruct the pump to operate at a high volume function, a low volume function, and turn off.

In some embodiments, the circuit board 307 may be in operable communication with a memory to enable the storage of operational instructions. For example, the memory more store operational instructions which instruct the pump to operate for a specified period of time during the air sampling process. The specified period of time may be stored and associated with a pump speed which enables the cassette to collect a sufficient sample of air required for an accurate test of air quality, contamination levels, etc.

Figure 4:
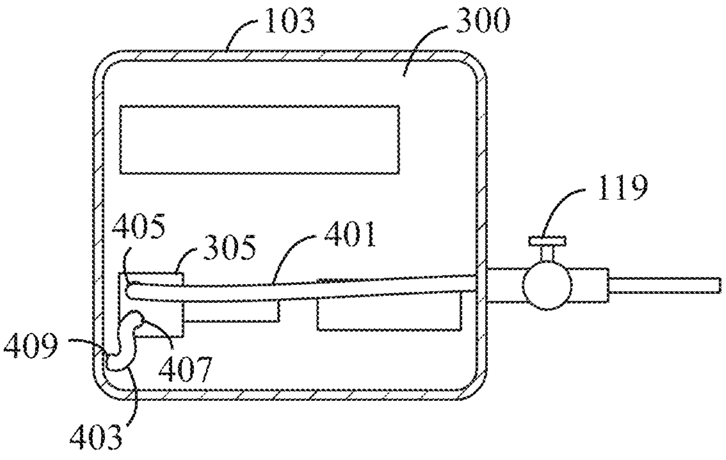
FIG. 4 illustrates a perspective view of the interior components of the housing including the input hose, output hose, and regulator for controlling and directing the flow of air through the pump, according to some embodiments.

FIG. 4 illustrates the interior 300 of the housing 103 to illustrate the input hose 401, output hose 403, and regulator 119. The input hose 401 is connected to the regulator 119 and enables the transfer of air through the regulator to the pump 305. In such, the input hose 401 connects an input port 405 provided on the pump 305 to the regulator 119 such that the pump can draw air into the cassette. The output hose 403 is connected to an output port 407 on the pump 305 and enables the egress of through the vent 409, thus preventing the pump 305 from becoming over pressurized.

Figure 5:
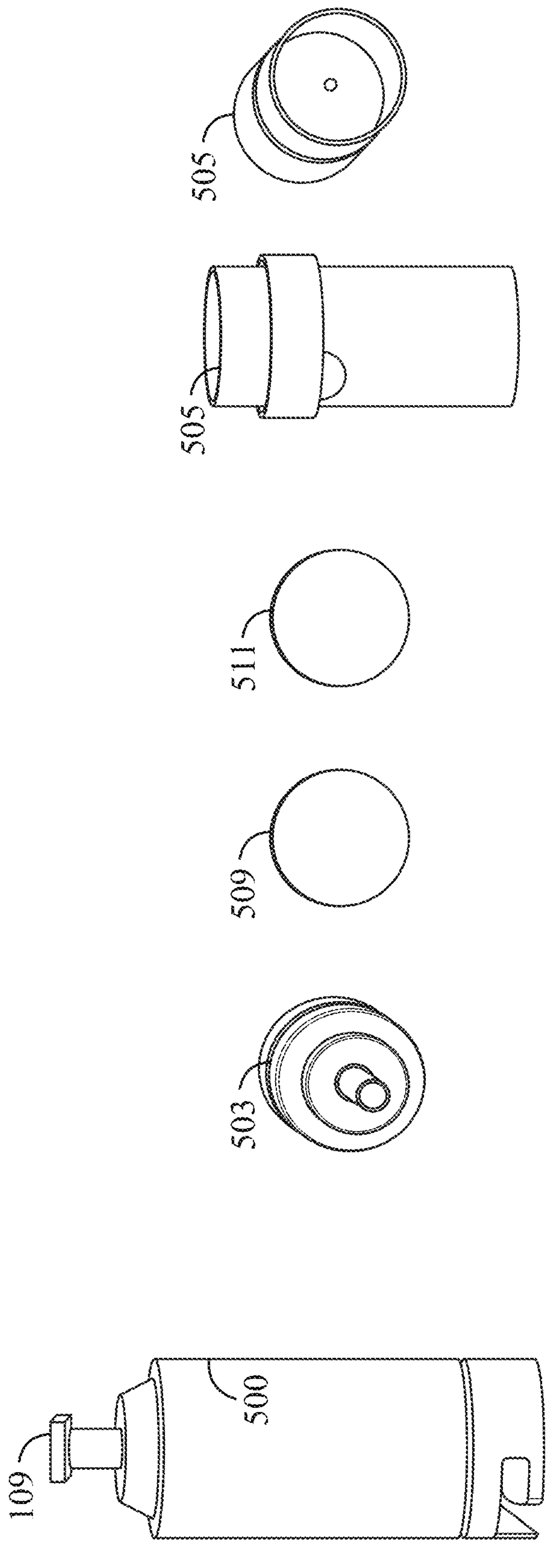
FIG. 5 illustrates a schematic of the cassette and cassette components used for collecting an air sample, according to some embodiments.

FIG. 5 illustrates the cassette 109 and cassette components used for collecting an air sample. The cassette is illustrated in an assembled configuration 500 while the components are illustrated being separated from one another for clarity. Each cassette 109 includes a cassette housing 501 having a top 503, a body 505, and a base 507. A filter 509 and backing sheet 511 are retained within the cassette housing 501. Each cassette 109 can be disconnected from the hose once the air sample has been collected. The cassette(s) 109 may then be analyzed by a testing facility and/or on-site personnel. One skilled in the arts will readily understand that the specific cassette 109 utilized by the air sampling pump described herein may be modified based on various considerations such as the hazards which are suspected in the particular environment.

In some embodiments, the cassette may be a 25 mm PCM 0.8 asbestos air monitoring cassette or a 25 mm TEM 0.45 asbestos air monitoring cassette. However, the specific cassette is described by way of example, and one skilled in the arts will readily understand that various cassette configurations may be used.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety to the extent allowed by applicable law and regulations. The systems and methods described herein may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

The foregoing is provided for purposes of illustrating, explaining, and describing embodiments of this disclosure. Modifications and adaptations to these embodiments will be apparent to those skilled in the art and may be made without departing from the scope or spirit of this disclosure.

As used herein and in the appended claims, the singular forms “a”, “an”, and “the” include plural referents unless the context clearly dictates otherwise.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

In many instances entities are described herein as being coupled to other entities. It should be understood that the terms “coupled” and “connected” (or any of their forms) are used interchangeably herein and, in both cases, are generic to the direct coupling of two entities (without any non-negligible (e.g., parasitic intervening entities) and the indirect coupling of two entities (with one or more non-negligible intervening entities). Where entities are shown as being directly coupled together or described as coupled together without description of any intervening entity, it should be understood that those entities can be indirectly coupled together as well unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

It will be appreciated by persons skilled in the art that the present embodiment is not limited to what has been particularly shown and described herein. A variety of modifications and variations are possible in light of the above teachings without departing from the following claims.

What is claimed is:

1. An air sampling pump, comprising:

a housing containing a pump, a rechargeable battery, and a switch, wherein the switch controls a speed of the pump;

a charging port in electrical communication with the rechargeable battery to enable power input to the rechargeable battery;

a coupler positioned on an exterior surface of the housing, the coupler to releasably connect a hose to the housing, wherein the hose is in fluid communication with the pump to enable the pump to draw air through at least one cassette positioned at an end of the hose, wherein the at least one cassette collects an air sample to enable the analysis of the air sample for at least one of the following: asbestos, lead, and mold.

2. The air sampling pump of claim 1, further comprising a circuit board in electrical communication with the switch, the circuit board to control the pump in response to a selection among an off function, a low volume function, and a high volume function.

3. The air sampling pump of claim 1, wherein the hose extends from the housing to a stand.

4. The air sampling pump of claim 3, wherein the stand is an adjustable tripod stand to enable the selection of a height of the adjustable tripod stand.

5. The air sampling pump of claim 1, wherein the at least one cassette is removable to permit an operator to remove the cassettes for an analysis process.

6. The air sampling pump of claim 1, wherein the housing includes a handle.

7. The air sampling pump of claim 1, wherein the speed is between 2-15 liters per minute.

8. The air sampling pump of claim 1, further comprising one or more feet to stabilize the housing and to prevent movement of the housing during operation of the pump.

9. The air sampling pump of claim 8, wherein the one or more feet each include a suction element.

10. An air sampling pump, comprising:

a housing containing a pump, a rechargeable battery, and a switch, wherein the switch controls a speed of the pump, the pump being configured to draw air through a hose in fluid connection with the pump, the hose being releasably connected to the housing via a coupler;

a charging port in electrical communication with the rechargeable battery to enable power input to the rechargeable battery;

at least one cassette connected to an end of the hose, the cassette to collect an air sample to enable the analysis of the air sample for at least one of the following: asbestos, lead, and mold.

11. The air sampling pump of claim 10, wherein each of the at least one cassettes are comprised of: a cassette housing having a top, a body, and a base, the cassette housing to contain a filter, and a backing sheet.

12. The air sampling pump of claim 10, wherein the hose extends from the housing to a top of a stand.

13. The air sampling pump of claim 12, wherein the stand is an adjustable tripod stand to enable the selection of a height of the adjustable tripod stand.

14. The air sampling pump of claim 10, wherein the at least one cassette is removable to permit an operator to remove the cassettes for an analysis process.

15. The air sampling pump of claim 10, wherein the speed is between 2-15 liters per minute.

16. The air sampling pump of claim 10, further comprising one or more feet to stabilize the housing and to prevent movement of the housing during operation of the pump.

17. An air sampling pump to enable the analysis of an air sample for a contaminant, the air sampling pump comprising:

a housing containing a pump, a rechargeable battery to supply power to the pump, and a switch, wherein the switch controls a speed of the pump to enable an operator to vary the speed of the pump between 2 liters per minute and 15 liters per minute, the pump being configured to draw air through a hose extending from a coupler to a top of a stand, wherein the hose in fluid connection with the pump via the coupler, the coupler being positioned on an exterior of the housing;

a charging port in electrical communication with the rechargeable battery to enable power input to the rechargeable battery;

at least one cassette connected to an end of the hose, the cassette to collect an air sample to enable the analysis of the air sample for at least one contaminant, the cassette comprising a housing to contain a filter and a backing sheet, wherein the air sampling pump is utilized before, during, and after abatement phases in an environment.

* * * * *